US011982429B2

(12) United States Patent
Ender et al.

(10) Patent No.: US 11,982,429 B2
(45) Date of Patent: May 14, 2024

(54) LIGHT SYSTEM WITH A MECHANICAL BLOCKING ELEMENT

(71) Applicant: ZUMTOBEL LIGHTING GMBH, Dornbirn (AT)

(72) Inventors: Claudio Ender, Nenzing (AT); Michael Spiegel, Dornbirn (AT); Wolfgang Bechter, Hittisau (AT)

(73) Assignee: Zumtobel Lighting GmbH, Dornbirn (AT)

( * ) Notice: Subject to any disclaimer, the term of this patent is extended or adjusted under 35 U.S.C. 154(b) by 0 days.

(21) Appl. No.: 17/918,346

(22) PCT Filed: Feb. 1, 2022

(86) PCT No.: PCT/EP2022/052306

§ 371 (c)(1),
(2) Date: Oct. 12, 2022

(87) PCT Pub. No.: WO2022/167401

PCT Pub. Date: Aug. 11, 2022

(65) Prior Publication Data

US 2023/0400173 A1 Dec. 14, 2023

(30) Foreign Application Priority Data

Feb. 4, 2021 (DE) ..................... 10 2021 102 568.0

(51) Int. Cl.
*F21V 21/002* (2006.01)
*F21V 21/005* (2006.01)

(52) U.S. Cl.
CPC .......... *F21V 21/002* (2013.01); *F21V 21/005* (2013.01)

(58) Field of Classification Search
CPC .......... F21V 5/002; F21V 5/005; F21V 5/025; F21V 21/002; F21V 21/005; F21V 21/025
See application file for complete search history.

(56) References Cited

U.S. PATENT DOCUMENTS

| | | | | |
|---|---|---|---|---|
| 2009/0284988 A1 | 11/2009 | Snagel et al. | | |
| 2013/0176728 A1* | 7/2013 | Bizzotto | ................. | F21V 5/007 362/244 |

FOREIGN PATENT DOCUMENTS

| | | |
|---|---|---|
| EP | 0515315 A1 | 11/1992 |
| EP | 1473807 A1 | 11/2004 |

OTHER PUBLICATIONS

PCT/EP2022/052306, International Search Report and Written Opinion, dated May 27, 2022, 14 pages and English Translation, 9 pages.

* cited by examiner

*Primary Examiner* — Robert J May
(74) *Attorney, Agent, or Firm* — Andrus Intellectual Property Law, LLP

(57) ABSTRACT

A luminaire system has a support rail comprising an elongated support profile and a current conducting profile arranged therein, as well as a component (electrical or electronic) with a coupling element for electrically and mechanically coupling the component to the support rail via an opening in the support profile. The luminaire system has a component with a coupling member that electrically couples and mechanically couples various components, said coupling member also having a blocking element.

17 Claims, 3 Drawing Sheets

LIGHT SYSTEM WITH A MECHANICAL BLOCKING ELEMENT

CROSS-REFERENCE TO RELATED APPLICATION

The present application is the U.S. national stage application of international application PCT/EP2022/052306 filed Feb. 1, 2022, which international application was published on Aug. 11, 2022 as International Publication WO 2022/167401 A1. The international application claims priority to German Patent Application 10 2021 102 568.0 filed Feb. 4, 2021.

TECHNICAL FIELD OF THE INVENTION

The present invention relates to a luminaire system having a support rail comprising an elongated support profile and a current conducting profile arranged therein, as well as a component (electrical or electronic) with a coupling element for electrically and mechanically coupling the component to the support rail via an opening in the support profile.

BACKGROUND OF THE INVENTION

Luminaire systems of the aforementioned type are known from the prior art, in principle. These usually comprise a support rail comprising an elongated support profile, which has an elongated opening via which one arrives at the inner space of the support profile. Within the support profile, a longitudinal current conducting profile is provided, to which different electrical or electronic components can be electrically coupled. These components are typically provided along the elongated opening adjacent to one another and often connected in series in order to form an elongated luminaire system, for example a light strip. The components are further mechanically coupled to the support profile for this purpose. The components comprise a coupling element for this purpose, which is electrically and mechanically coupled to the support rail by means of actuation after insertion thereof into the inner space of the support profile. In known embodiments, this coupling element is configured as a so-called "rotary knob," which is provided rotatably about an axis of rotation extending in the insertion direction and has electrical and mechanical projections protruding laterally or radially to the axis of rotation, which, upon rotation of the rotary knob about the axis of rotation, move into corresponding contours (for mechanical coupling) or the current conducting profile (for electrical coupling), respectively. Forces can be produced during the electrical or mechanical coupling which lead to a deformation of the support profile, which in turn can lead to a loosening or, in the worst case, the failure of the mechanical coupling. The influence of further factors, such as the operating temperature, can also lead to fluctuating tolerances and, if applicable, more flexible material behavior, which can weaken both the electrical and mechanical coupling.

SUMMARY OF THE INVENTION

It is thus a problem of the present invention to provide a luminaire system of the above-mentioned type, which enables a secure mechanical and electrical coupling.

This problem is solved by the subject matter of the independent claim. The dependent claims further develop the central concept of the present invention in a particularly advantageous manner.

According to one aspect, the present invention relates to a luminaire system comprising a support rail as well as a (electrical or electronic) component. The support rail in turn has an elongated support profile with a longitudinal extension. The support profile in turn delimits an inner space. The support rail further comprises a current conducting profile, which extends longitudinally into the inner space. The current conducting profile in turn comprises wires for supplying power and/or transmitting digital control commands. The support profile is formed by at least two side walls delimiting a longitudinal opening in a laterally opposed manner and a rear wall connecting the side walls. These thus preferably delimit the aforementioned inner space of the elongated support profile. The component in turn comprises a coupling element. The coupling element can be inserted into the inner space of the support profile via the opening and can be actuated therein, such that simultaneously a contacting element of the coupling element electrically contacts the wires of the current conducting profile for the electrical connection of the component and a locking element of the coupling element interacts with locking portions of the side walls of the support profile provided on both sides of the opening for mechanically coupling the component to the support profile. The component further comprises a blocking element having blocking portions. With the coupling element inserted, the blocking portions are arranged adjacent to one of the side walls, respectively, at an outer side of this side wall facing away from the inner space, so that the blocking portions prevent a release of the mechanical coupling—and preferably also of the electrical connection, i.e., preferably while maintaining the electrical contact—by a migration of the respective side wall away from the inner space.

According to the present invention, the component is consequently provided with a further protection mechanism. The component is thus provided along with the aforementioned blocking element. By inserting the coupling element, the blocking element is thus positioned accordingly and is provided adjacent to the respective side wall(s) externally in order to limit or prevent their migration laterally in such a way that, even when the coupling element is actuated, along with possibly resulting transverse forces due to a contact of the contacting elements with the wires or interaction of the locking elements with corresponding locking portions, a release of the mechanical—and preferably also electrical—coupling is prevented. In general, an electrical contacting with significantly greater tolerances than the mechanical coupling is provided, so that a failure usually occurs first in the mechanical coupling. In addition, from a technical safety point of view, the failure of the mechanical coupling usually poses a greater risk, because a falling luminaire weighs more than, for example, an improperly operable luminaire due to failure of an electrical contact. With the system according to the invention, it is thus possible to safely mechanically couple heavy components to the support rail, for example. It is also possible to provide a complex electrical contacting in a safe manner (e.g. with sufficiently large tolerances by means of electrical spring contacts) without needing to fear an interference with the mechanical coupling. Due to the additional stabilization of the mechanical coupling, it is also conceivable to design the support profile more intricately, because the mechanical coupling is now safely supported over a further region, and it is preferably provided in the opposite direction as a type of clamping connection. This in turn allows more flexibility in the choice of the material, for example in terms of the type and material thickness, as well as in the design of the luminaire system and in particular the support profile.

Preferably, the locking portions can project in the direction of the inner space such that, when the coupling element is actuated, the locking element engages with the locking portions in order to mechanically couple the components to the support profile. In this way, a particularly simple mechanical coupling can be provided, which is ultimately effectively secured by the blocking element.

Preferably, at least one blocking portion is respectively associated with each side wall. In this way, the luminaire system as a whole can be configured particularly securely. This also allows more flexibility with regard to the entire luminaire system, and in particular the design of the support profile.

Preferably, the blocking portions are integrally formed with one another in order to form the blocking element. Thus, the stability of the blocking element in general, as well as the blocking portions in particular, can be further increased. In addition, the blocking element can be easily manufactured and handled.

The blocking element can preferably comprise a base carrier, away from which the blocking portions extend; preferably to the same side of the base carrier and/or parallel to one another. By providing a connecting base carrier, the blocking element can be formed in a stable manner overall. Arranging the blocking portions on the base carrier also stabilizes them accordingly. Such a configured blocking element can also be easily manufactured and provide for a secure lateral support.

Preferably, the base carrier can be plate-shaped. In addition, the blocking portions can extend laterally away from the base carrier as webs. The webs can be provided along at least a part of opposing sides of the plate-shaped base carrier or distributed along the opposing sides. Thus, for example, the blocking portion configured as a web can form a folded-over side edge of the base carrier. Thus, a correspondingly extensive support effect can be achieved. If the webs are distributed along the sides, the blocking portions can be provided at defined regions. In addition, material can be saved.

Preferably, the blocking element is substantially U-shaped. The comparatively simple structure of the blocking element allows for simple manufacture of the same. In addition, the U-shaped configuration represents an effective lateral support of the side walls by the blocking element. The U-shaped blocking element is also easy to assemble and automatically encompasses the side walls in question during assembly of the component, which facilitates an intuitive assembly with correct positioning of the components.

The blocking portions can each be arranged in groups of two or more blocking portions. Preferably, they can be arranged transverse to the longitudinal extension and substantially flush with one another. The functional allocation of multiple blocking portions can provide for an overall high stability of the blocking element. In particular in the case of correspondingly flush blocking portions, they can serve in a defined region for a particularly high stability of the luminaire system in general and of the mechanical coupling in particular.

Preferably, a plurality of blocking portions can be provided per side wall. These are preferably spaced apart from one another in the direction of the longitudinal extension. Thus, the stability of the blocking element as a whole can be increased, and a provision of the same can be made possible at desired defined positions.

Preferably, the actuation is a rotational movement. This can preferably occur around at least one fixed axis of rotation. The coupling element is preferably provided rotatably for the actuation. Actuation by means of rotational movement requires comparatively little space, so that the components can be designed as compact as possible. In particular, the coupling element can be configured as or comprise a rotary knob. By a simple but safe mechanism, the contacting element and the locking element can thus be pivoted and brought into operative contact with the corresponding regions on the support rail.

The coupling element can preferably be formed in multiple pieces. The plurality of parts can preferably be engaged with one another in such a way that an actuation of one of the parts causes an actuation of all parts. In the event of a rotational movement as the actuation, each of the parts can preferably have a (fixed) axis of rotation. These multiple axes of rotation can be particularly preferably aligned parallel to one another. In this way, it is possible to distribute the contacting elements and locking elements in any way over these parts in order to thus provide them at defined and, in the best case, functionally optimal positions. Also, by means of these multiple parts, for example, it can be easily enabled to provide the number of electrical contacting parts or mechanical coupling parts as desired; for example, to increase them. Thus, an overall particularly flexible luminaire system can be provided. For example, it is conceivable that some components can require additional mechanical coupling, such that, for example, the coupling element can be extended by a further part with a locking element for mechanical coupling. It is also conceivable that additional electrical connection options are required, such that the additional part comprises corresponding electrical contacting elements.

Overall, the coupling element can preferably comprise a plurality of contacting elements or, correspondingly, a plurality of contacting parts for electrical contacting and/or a plurality of locking elements or a plurality of locking parts for mechanical coupling. The luminaire system can thus be provided and configured to a high degree in a flexible manner.

Preferably, the current conducting profile can be arranged on at least one of the two inner sides of the side walls facing the inner space. The wires can then be accessible via longitudinal grooves extending in the direction of the longitudinal extension. The contacting element can then be configured so as to be insertable into the grooves when the coupling element is inserted by actuating the coupling element for electrical contacting with the wires. One example of such a configuration is a rotary knob already described above. In this way, in particular, an electrical contacting can be provided in a particularly simple manner.

Preferably, the luminaire system can comprise a plurality of the support rails, which are preferably provided longitudinally adjacent to one another in series. Thus, a luminaire system of any desired length of branching can be formed, which significantly increases the overall flexibility of the luminaire system. It is further preferred that the inner spaces of the support rails or their support profiles form a contiguous system space. This can in turn preferably be accessible by a contiguous system opening formed from the openings for inserting the coupling element into the system space and actuating the coupling element there. Thus, for example, it can be made possible to form an arbitrarily configured system, which can be equipped with components at any desired position and continuously regardless of the individual support rails and over the entire system length. This in turn further increases the flexibility of the luminaire system.

Preferably, the luminaire system can comprise a plurality of the components, which are then preferably provided adjacent to and preferably abutting one another along the opening or along the system opening. Thus, the luminaire system can be equipped with different and multiple components in any way, which further increases the flexibility of the luminaire system overall.

The component can particularly preferably be any type of electrical or electronic component, such as a luminaire, sensor, speaker, operating device, or combination thereof. The luminaire system can thus be equipped with any electrical or electronic components, which further increases the possible uses of the luminaire system.

BRIEF DESCRIPTION OF THE DRAWINGS

Further features, advantages, and problems of the present invention will now be described on the basis of an exemplary embodiment of the invention in connection with the drawings in the accompanying figures. The figures show.

DETAILED DESCRIPTION OF THE PREFERRED EMBODIMENT

The figures show an elongated luminaire system 1 according to the invention as well as an electrical or electronic component 3 thereof. The electrical or electronic component 3 can preferably be a luminaire, in particular a light strip luminaire or a spot luminaire or ceiling luminaire, etc. Also, the component 3 can be any other electrical or electronic component, such as a sensor, a speaker, an operating device, and much more, etc., or a combination thereof.

Figure 2:
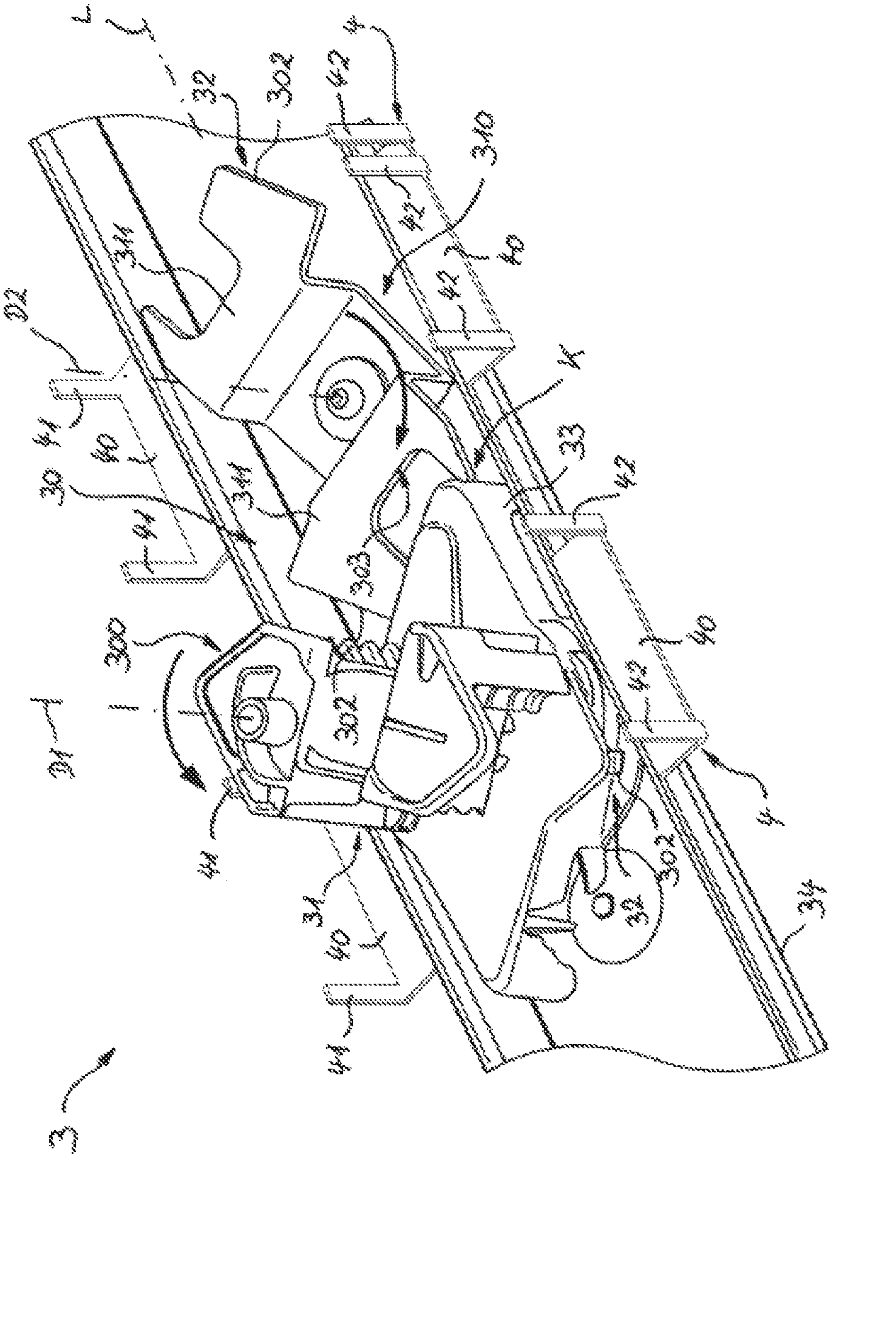
FIG. 2 is a perspective detail view of a component of the luminaire system according to FIG. 1 in an unactuated position of the coupling element.
Figure 3:
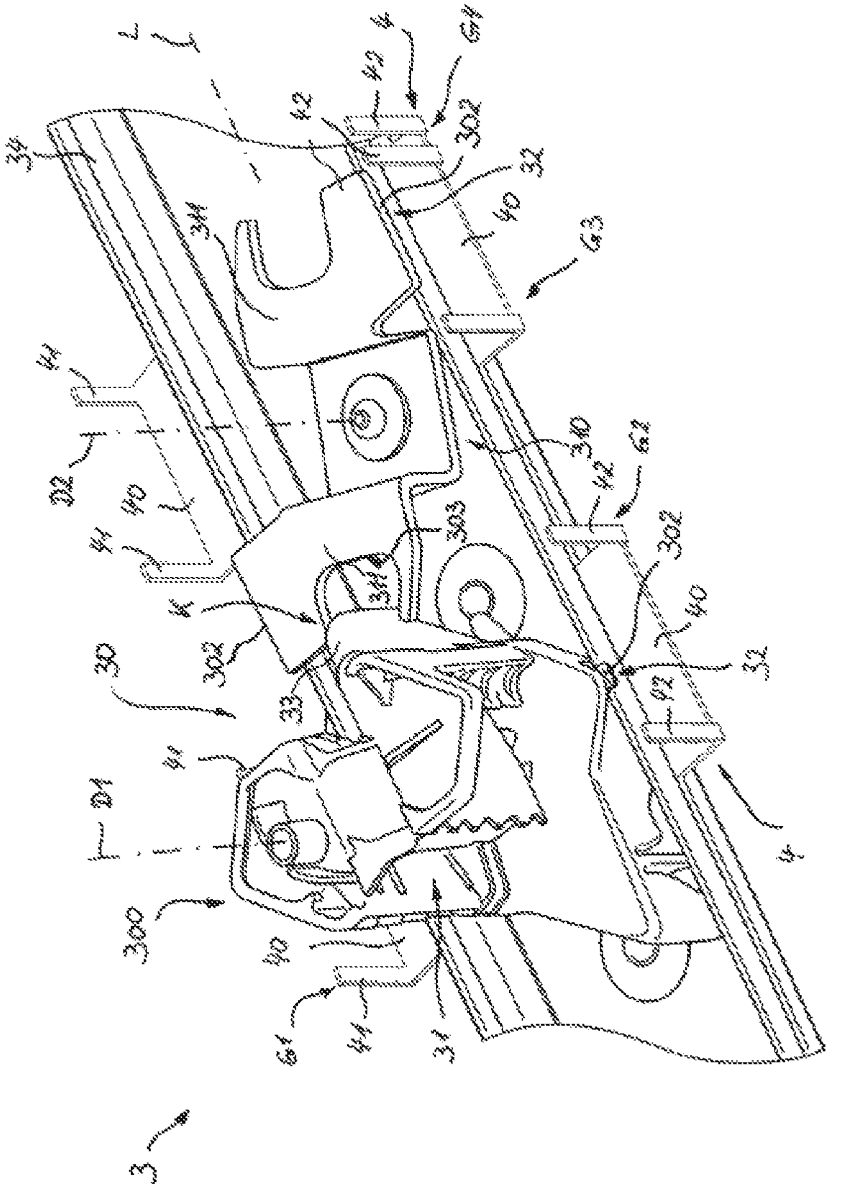
FIG. 3 is a perspective detail view of the component according to FIG. 2 in an actuated position of the coupling element.

In addition to the component 3, the luminaire system 1 further comprises a support rail 2. The support rail 2 in turn has an elongated support profile 20 with a longitudinal extension L. Only the longitudinal extension L of the support profile 20 is shown in FIGS. 2 and 3, while the support rail 2 is not depicted in these figures for improved visibility. The support profile 20 preferably extends in a straight line along the longitudinal extension L. Alternatively, a different longitudinal extension is also conceivable, such as a (multiple) angled, curved, undulating, zig-zag-shaped, etc. longitudinal extension. The support profile 20 delimits an inner space I.

The support rail 2 further comprises a current conducting profile 21 with wires 22 arranged extending longitudinally in the inner space I for supplying power and/or transmitting digital control commands.

Figure 1:
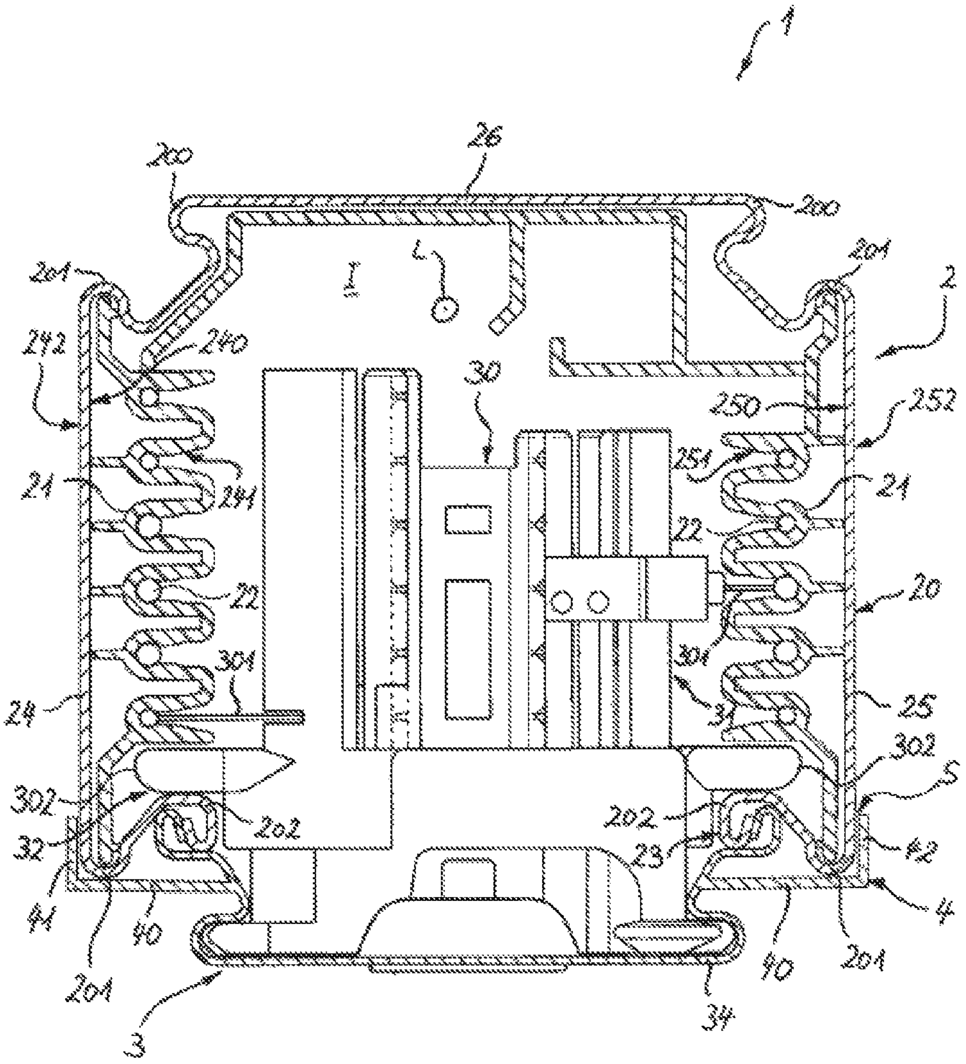
FIG. 1 is a cross-sectional view of a luminaire system according to a first exemplary embodiment of the present invention when viewed in the direction of the longitudinal extension.

As can in particular be seen in FIG. 1, the support profile 20 is formed at least by two side-delimiting side walls 24, 25 and a rear wall 26 connecting the side walls 24, 25, which are at least one elongated opening 23. In the exemplary embodiment shown here, the support profile 20 is substantially U-shaped when viewed in the profile cross-section in the direction of the longitudinal extension. However, the profile cross-section can also include any other shape or contour, such as a V-shape, a partial circle shape, etc. In particular, the side walls 24, 25 and the rear wall 26 can also be interconnected in any other manner and by further elements or, as shown, can transition directly into one another.

As shown, the support profile 20 can have different structural regions. For example, the support profile 20 has a support structure 200 on its rear wall 26, via which the luminaire system 1 can be assembled; for example, on a corresponding bracket of a ceiling mounting or on a corresponding fastening element of a suspension as a pendant light. Furthermore, the side walls 24, 25 can have holding structures 201 for supporting the insertion of the current conducting profile 21, as shown for example in FIG. 1. These or other or further structural elements 200, 201 preferably extend over the entire length of the support profile 20.

The component 3 comprises a coupling element 30. The coupling element 30 can be inserted into the inner space I of the support profile 20 via the opening 23 and can be actuated therein, such that simultaneously a contacting element 31 of the coupling element 30 electrically contacts the wires 22 of the current conducting profile 21 for the electrical connection of the component 3 and a locking element 32 of the coupling element 30 interacts with locking portions 202 of the side walls 24, 25 of the support profile 20 provided on both sides of the opening 23 for mechanically coupling the component 3 to the support profile 20. Preferably, the locking portions 202 protrude in the direction of the inner space I, as shown here in FIG. 1, such that when the coupling element 30 is actuated, the locking element 32 engages with the locking portions 202 in order to mechanically couple the component 3 to the support profile 20. The locking portions 202 are also preferably formed here by structural regions of the support profile which also preferably extend here along the entire length of the support profile 20 in the direction of the longitudinal extension L.

As shown, the contacting element 31 can comprise a plurality of contacting parts 301 for direct contacting with the wires 22. Likewise, the locking element 32 can include a plurality of locking portions 302 for direct mechanical coupling to the corresponding locking portions 202.

In a preferred embodiment, as can be seen in the illustrated exemplary embodiment, the actuation can be a rotational movement. This takes place preferably about at least one fixed axis of rotation D1, D2. The coupling element 3 can thus be provided rotatably overall for the actuation, as can be seen in particular in FIGS. 2 and 3.

The coupling element 30 can preferably be configured in multiple parts, as can be seen in the present exemplary embodiment of FIG. 2 and FIG. 3. The plurality of parts 300, 310 are preferably engaged with one another such that an actuation of one of the parts 300 causes the actuation of all parts 300, 310. As shown, in the event of a rotational movement as the actuation, each of the parts 300, 301 can have an axis of rotation D1, D2, which is fixed here. Preferably, these are aligned parallel to one another so that a transfer of the rotational movements can occur in a simple manner.

According to the exemplary embodiment, the coupling element 30 comprises a so-called rotary knob as one of its parts 300. This rotary knob 300 has preferably opposing terminal contacts that protrude laterally here, i.e., radially with respect to the axis of rotation D1, as contacting parts 301 of the contacting element 31. The knob 300 here similarly has, comparably to the terminal contacts, preferably opposing catch projections that protrude laterally, i.e., radially with respect to the axis of rotation D1, as locking parts 302 of the locking element 32.

The current conducting profile 21 can be arranged on at least one or, as shown here, on both of the two inner sides 240, 250 of the side walls 24, 25 facing inner space I. The wires 22 can then be accessible via longitudinal grooves 241, 251 extending in the direction of the longitudinal extension L, as shown here. The contacting element 31 is then preferably insertable into precisely these longitudinal grooves 241, 251, when the coupling element 30 is inserted, by actuating the coupling element 30—here, by a rotational movement about the axis of rotation D1—for electrically contacting the wires 22.

Comparably, the locking portions 302 of the locking element 32 can be moved behind the locking portions 202 relative to the opening 23 in order to thus rearwardly engage with them and accomplish the mechanical coupling.

In addition to the rotary knob 300, the coupling element 3 here comprises a further part in the form of a mechanical locking element 310. This locking element 310 is also rotatable about a fixed axis of rotation D2, which is aligned parallel to the axis of rotation D1. The locking element 310 is formed in a wing-like manner, wherein the opposing wings 311 comprise lateral protrusions as the locking portion 302 for forming a locking element 32. Via a coupling region K, which is formed here by a projection 33 of the rotary knob 300 that is radial with respect to the axis of rotation D1 on the one hand and a recess 303 of one of the wings 311 into which the projection 33 engages on the other hand, a rotational movement is transferred from the rotary knob as the first part 300 to the locking element as a second part 310. Thus, these two parts 300, 310 are always rotated or actuated simultaneously.

In the exemplary embodiment shown herein, the two parts 300, 310 each comprise a locking element 32, and the first part 300 also comprises a contacting element 31. However, it is also conceivable that the contacting elements 31 or their contacting parts 301 as well as the locking elements 32 or their locking parts 302 are provided in any other way, being distributed on these two or also more parts 300, 310 of the coupling element 30.

The component 3 further comprises a blocking element 4 with blocking portions 41, 42, as can be seen in particular in FIG. 1. As can be seen in FIG. 1, these blocking portions 41, 42 are arranged adjacent to each of the side walls 24, 25 at outer sides 242, 252 facing away from the inner space I when the coupling element 30 is inserted, such that the blocking portions 41, 42 prevent a release of the mechanical coupling by means of migration of the respective side wall 24, 25 away from the inner space I, when the coupling element 30 is actuated. Thus, there is a migration of the left side wall 24 to the left and a migration of the side wall 25 (shown here on the right) to the right. As shown, the blocking portions 41, 42 need not abut directly against the respective side walls 24, 25; rather, a gap S can also be provided between the respective side wall 24, 25 and the associated blocking portion 41, 42. This can enable a simple insertion of the component 3 into the support profile 20, for example. However, it is of course also conceivable that the blocking portions 41, 42 directly abut the associated side wall 24, 25 already in the resting position.

In addition, with the corresponding provision of the blocking element 4 and its blocking portions 41, 42, when the coupling element 30 is actuated, it is preferable to further prevent the electrical contacting from being released by a migration of the respective side wall 24, 25 away from the inner space I. Because the electrical contacting often has a greater tolerance than the mechanical coupling, this is usually already the case structurally. In either case, based on the generally greater risk proceeding from a failure of the mechanical coupling compared to a failure of the electrical contacting, the former is to be ensured in any case by means of the present invention; and preferably the latter as well, in order to enable permanently safe operation of the luminaire.

As can in particular be seen in FIG. 1, each side wall 24, 25 can be associated with at least one blocking portion 41, 42, respectively.

Preferably, the blocking portions 41, 42 can be integrally formed with one another in order to form the blocking element 4. The blocking element 4 can preferably comprise a base carrier 40, away from which the blocking portions 41, 42 extend. This is preferably to the same side of the base carrier 40 and/or parallel to one another, as shown in FIG. 1. Preferably, the base carrier 40 can be plate-shaped. In addition, the blocking portions 41, 42 can extend laterally away from the base carrier 40 as webs. The webs can be distributed along at least a part of opposite sides of the plate-shaped base carrier 40 or along the opposite side (cf. FIG. 2, 3). The base carrier 40 can be formed in multiple pieces (here in two parts), as shown, and can preferably also be an integral part of a housing 34 of the component 3. Of course, the blocking element 4 or its blocking portions 41, 42 can also be provided as separate component(s), which is/are then attached to a region of the component 3 facing the support rail 2 or its support profile 20, for example.

The blocking element 4 can be manufactured in a preferred design form, for example from a sheet metal. Preferably, the blocking element 4 can be manufactured, for example, in a bending process or a punch-bending process; this can be as a separate component or as an integral component of a part (e.g. housing 34) of the component 3.

The blocking element 4 is particularly preferably substantially U-shaped, at least in the direction of the longitudinal extension L, as can be seen, for example, in the illustration of FIG. 1.

As can be seen by way of example from FIGS. 2 and 3, the blocking portions 41, 42 can each be arranged in groups G1-G4 of two or more blocking portions 41, 42. This is preferably arranged transversely to the longitudinal extension L in a substantially flush manner. In the figures, three groups G1, G2, G3, each with two aligned blocking portions 41, 42, and another group G4 with three substantially aligned blocking portions 41, 42 are shown by way of example.

For each side wall 24, 25, a plurality of blocking portions 41, 42 can also be provided. These can then preferably be provided spaced apart from one another in the direction of the longitudinal extension L.

Preferably, the luminaire system 1 can comprise a plurality of the support rails 2. These can then preferably be provided longitudinally in series adjacent to one another. It is particularly preferred that this is done in such a way that its inner spaces I form a contiguous system space. This system space can preferably be accessible through a contiguous system opening formed from the openings 23 for inserting the coupling element 30 into the system space and actuating the coupling element 30 there.

Likewise, the luminaire system 1 can further comprise a plurality of the components 3. These are then provided preferably adjacent to or abutting one another—preferably longitudinally in series—along the opening 23 or also along the system opening. In this way, for example, a continuous light strip can be formed. For example, different functional components 3, such as sensors, etc., can also be inserted into the light strip. Thus, a particularly flexible luminaire system 1 can be formed overall.

The present invention is not limited by the aforementioned exemplary embodiment, insofar as it is addressed by the subject matter of the following claims.

The invention claimed is:

1. A luminaire system (1) comprising:

a support rail (2), which comprises an elongated support profile (20) with a longitudinal extension (L) delimiting an inner space (I) as well as a current conducting profile (21) with wires (22) arranged extending longitudinally in the inner space (I) for supplying power and/or transmitting digital control commands, wherein the support profile (20) is formed by at least two side walls (24, 25) a rear wall (26) connecting the side walls (24, 25), each side wall having a substantially exposed outer surface and a locking portion disposed inward from the substantially exposed outer surface, the side walls delimiting a longitudinal opening (23) in a laterally opposed manner and a component (3) having a coupling element (30), which can be inserted into the inner space (I) of the support profile (20) via the opening (23) and can be actuated therein, such that simultaneously a contacting element (31) of the coupling element (30) electrically contacts the wires (22) of the current conducting profile (21) for the electrical connection of the component (3) and a locking element (32) of the coupling element (30) interacts with the locking portions (202) of the side walls (24, 25) of the support profile (20) provided on both sides of the opening (23) for mechanically coupling the component (3) to the support profile (20), wherein the component (3) further comprises a blocking element (4) that is substantially U-shaped with blocking portions (41, 42) and a base carrier (40) away from which the blocking portions (41, 42) extend, the blocking portions being arranged adjacent to each of the side walls (24, 25) at outer sides (242, 252) facing away from the inner space (I) when the coupling element (30) is inserted, such that the blocking portions (41, 42) prevent a release of the mechanical coupling by means of migration of the respective side wall (24, 25) away from the inner space (I), when the coupling element (30) is actuated.

2. The luminaire system (1) according to claim 1, wherein the locking portions (202) project in the direction of the inner space (I) such that, when the coupling element (30) is actuated, the locking element (32) rearwardly engages with the locking portions (202) for mechanical coupling of the component (3) to the support profile (20).

3. The luminaire system (1) according to claim 1, wherein the component also has a housing (34) that does not cover the side walls (24, 25) of the elongated support profile and each side wall (24, 25) is respectively associated with at least one blocking portion (41, 42).

4. The luminaire system (1) according to claim 3, wherein the blocking portions (41, 42) are integrally formed with the housing in order to form the blocking element (4).

5. The luminaire system (1) according to claim 3, wherein the blocking element (4) is a separate from the housing and the base carrier of the blocking element is attached to the housing with the blocking portions (41, 42) extending upward from the base carrier (40) and parallel to one another.

6. The luminaire system (1) according to claim 5, wherein the base carrier (40) is plate-shaped and the blocking portions (41, 42) extend away as webs laterally to the base carrier (40), wherein the webs are distributed along at least a portion of opposite sides of the plate-shaped base carrier (40) or along the opposite sides.

7. The luminaire system (1) according to claim 1, wherein the top edge and the bottom edge of the profile side walls comprise holding structures (201) for supporting the current conducting profile.

8. The luminaire system (1) according to claim 1, wherein the blocking portions (41, 42) are arranged in groups (G1, G2, G3, G4) of two or more blocking portions (41, 42), respectively, which are arranged transversely to the longitudinal extension (L) in a substantially flush manner.

9. The luminaire system (1) according to claim 1, wherein a plurality of blocking portions (41, 42) are provided per side wall (24, 25), which blocking portions are spaced apart from one another in the direction of the longitudinal extension (L).

10. The luminaire system (1) according to claim 1, wherein the actuation is a rotational movement, about at least one fixed axis of rotation (D1, D2), and/or wherein the coupling element (30) is provided rotatably for actuation.

11. The luminaire system (1) according to claim 1, wherein the coupling element (30) is formed in multiple parts, wherein the plurality of parts (300, 310) are engaged with one another such that an actuation of one of the parts (300) causes the actuation of all parts (300, 310), wherein, in the case of a rotational movement as the actuation, each of the parts (300, 310) has an axis of rotation (D1, D2), which axes are aligned parallel to one another.

12. The luminaire system (1) according to claim 1, wherein the coupling element (30) comprises a plurality of contacting elements (31) and/or a plurality of locking elements (32).

13. The luminaire system (1) according to claim 1, wherein the contacting element (31) comprises a plurality of contacting parts (301) for electrical contacting, and/or wherein the locking element (32) comprises a plurality of locking parts (302) for mechanical coupling.

14. The luminaire system (1) according to claim 1, wherein the current conducting profile (21) is arranged on at least one of the two inner sides (240, 250) facing the inner space (I) of the side walls (24, 25), wherein the wires (22) are accessible via longitudinal grooves (241, 251) extending in the direction of the longitudinal extension (L), and wherein, when the coupling element (30) is inserted, the contacting element (31) is insertable into the longitudinal grooves (241, 251) by actuation of the coupling element (30) for electrical contact with the wires (22).

15. The luminaire system (1) according to claim 1, comprising a plurality of the support rails (2), which are provided longitudinally in series adjacent to one another, so that their inner spaces (I) form a contiguous system space, which is accessible through a contiguous system opening formed from the openings (23) for inserting the coupling element (30) into the system space and for actuating the coupling element (30) there.

16. The luminaire system (1) according to claim 1, comprising a plurality of components (3) which are provided adjacent to and abutting one another along the opening (23).

17. The luminaire system (1) according to claim 1, comprising a plurality of components mounted to the elongated support profile along the opening (23), wherein the mounted components comprise a combination of at least two components selected from the group of a luminaire, a sensor, a speaker, and an operating device.

* * * * *